July 6, 1926.

H. D. SAWKINS

BAKING MACHINE

Filed August 19, 1925     2 Sheets-Sheet 1

1,591,945

Witnesses

Inventor
Huntington D. Sawkins
By Edwin J. Samuels
Attorney

July 6, 1926.
H. D. SAWKINS
1,591,945
BAKING MACHINE
Filed August 19, 1925    2 Sheets-Sheet 2
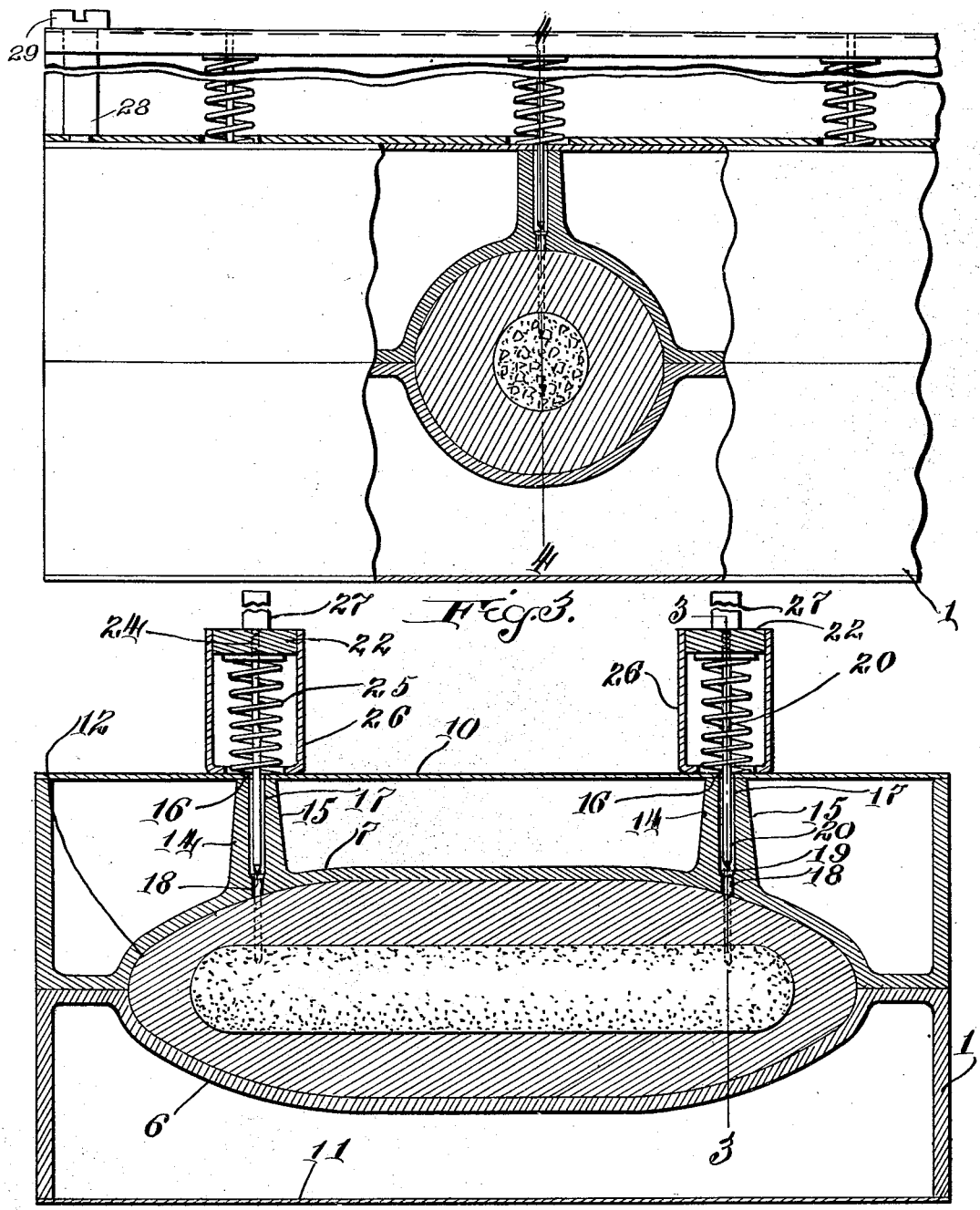

Patented July 6, 1926.

1,591,945

UNITED STATES PATENT OFFICE.

HUNTINGTON D. SAWKINS, OF BALTIMORE, MARYLAND.

BAKING MACHINE.

Application filed August 19, 1925. Serial No. 51,158.

The invention relates to a machine for baking rolls, particularly sausage rolls, as illustrated in my previous Patent No. 1,547,614, dated July 28th, 1925, by placing a charge of dough, in which a sausage is enclosed, in a mold, closing the mold, and maintaining it at baking temperature for a period sufficient to bake the sausage and the dough, though, if desired, the sausage may be partially cooked before placing it in the machine.

The majority of purchasers prefer a roll which is fairly well browned and crisp as to the crust, and flavored with the aroma of the sausage in cooking. They also prefer a sausage which has been cut or otherwise opened in cooking, permitting it to swell and break from the skin. It is difficult or impossible to bake crisply or brown a roll in the presence of an excess of moisture, and in the machines of this general type, as previously made, it has been exceedingly difficult to release or dispose of the moisture and obtain a brown and crisped product. Even the provision of a vent hole or escape valve would hardly prove effective, as experiment shows the opening becomes clogged with dough or crust and does not produce the desired result. The crust forms before any considerable proportion of the moisture is released, and this prevents the escape of moisture from the roll. Also the cooking of the sausage in this way gives more the effect of boiling than broiling or baking, but the latter two methods of cooking give a more tasty product.

The present invention relates to an improved device whereby the difficulty referred to is entirely disposed of. It consists of a vent hole provided with an automatically retracted clearing and punching member, which not only clears the opening but punctures the crust as formed and also punctures the sausage, providing a hole for the escape of the accumulated moisture from the dough and from the sausage.

The sausage baker, as illustrated more fully in my previous patent referred to, is a gang machine in which from six to a dozen or two of sausage rolls are baked simultaneously, and the apparatus includes means for actuating the clearing and punching members for the entire machine simultaneously.

In the accompanying drawing I have illustrated a machine embodying my invention in the preferred form.

In the drawing,—

Figure 3 is a fragmentary view partly in front elevation, showing the machine closed and also having a portion broken away to show one of the units of the mold in transverse section on the line 3, 3 Figure 4.

Figure 4 is a section on the line 4, 4 of Fig. 3.

Figure 1:
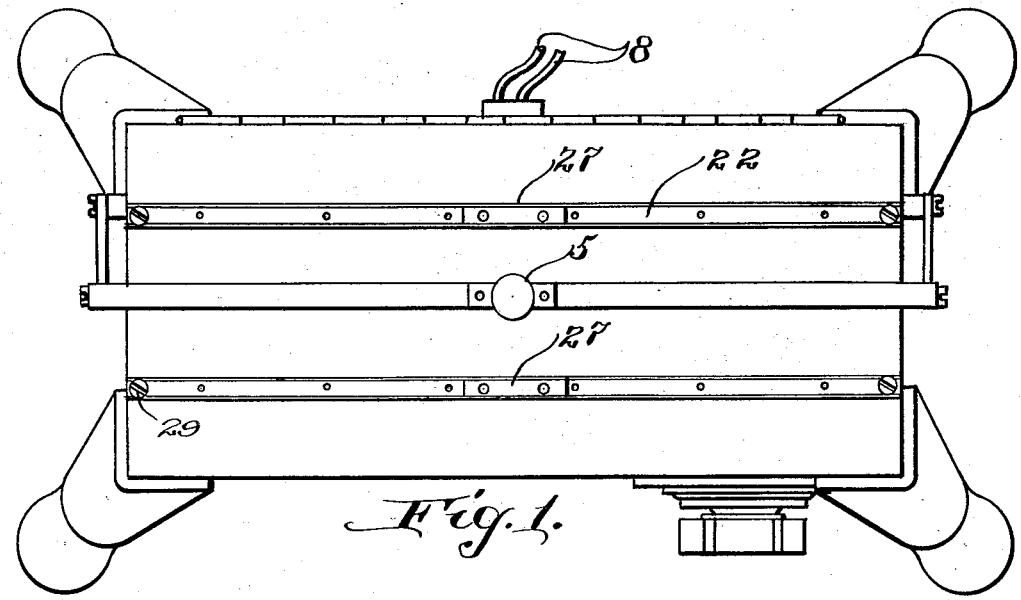
Figure 1 is a top plan of the machine.
Figure 2:
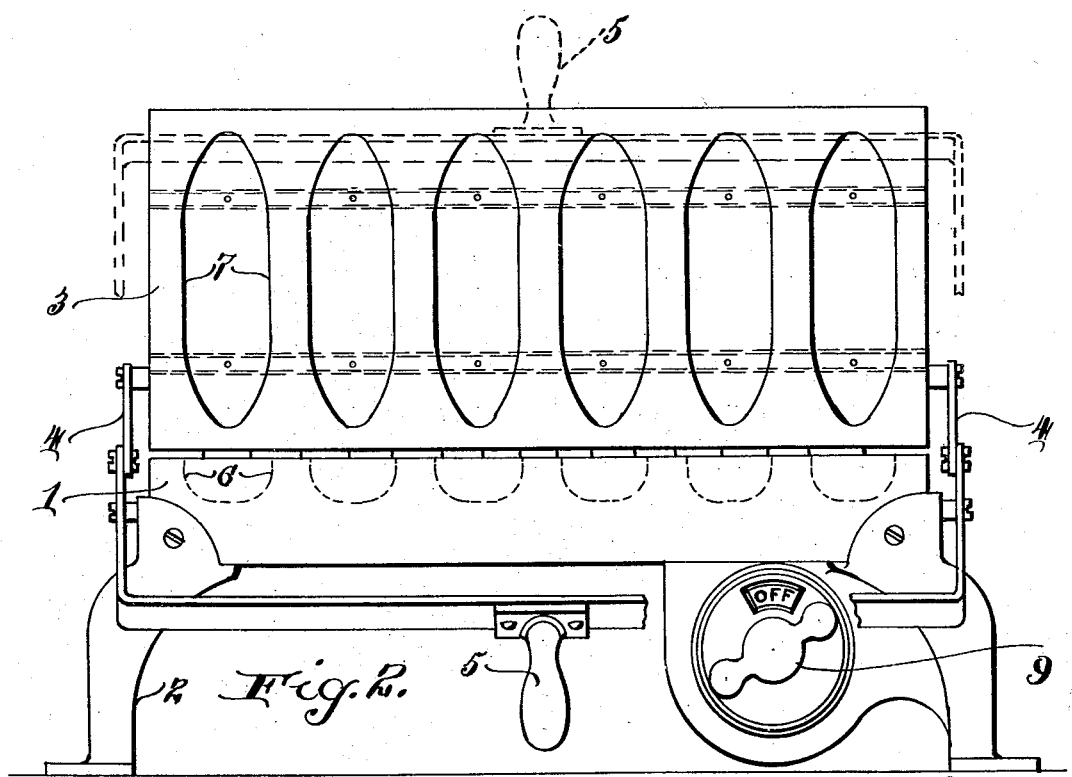
Figure 2 is a front elevation of the machine open for the removal of the finished product.

Referring to the drawings by numerals, each of which is used to indicated the same or similar parts in the different figures, the illustration shows a molding and baking machine in the form of what may be termed a two-part mold comprising a base or bottom section 1 supported on suitable uprights 2, and an upper mold section 3 hinged to swing relatively to the base on a suitable link connection 4 actuated by handle 5, as illustrated herein and described in my previous patent. The bottom section 4 and the top section 3 are provided with registering mold cavities 6 and 7 forming units 12 heated in any suitable manner, as by electrical units not shown, connected to a source of electricity by wiring 8 or in any suitable manner, and controlled by the on and off switch 9.

The important feature of the invention resides in the vents and vent pins for clearing the vents and puncturing the rolls and sausages as hereinafter described. The mold sections as shown have the mold cavities 7 of the upper section suitably encased above by a casing 10 and the mold cavities 6 of the lower mold section similarly encased below by a casing 11. The vents 14, as shown, are placed one at each end of each unit, though any suitable number may be provided. They comprise each a tubular extension 15 of the upper mold cavity 7 of each unit, the extensions being shown as leading vertically upward from the wall of the mold cavity to the casing 10, which is suitably apertured at 16 in registration with the bore or opening 17 of the corresponding tube, and in the form of the invention shown, each of said bores 17 is provided near the bottom where it opens into the mold cavity with an inclined shoulder 19 forming a reduced portion 18. Each vent is further provided with a corresponding punch and vent clearing pin 20 which may be pointed as shown, and is preferably of a considerably reduced diameter as compared to the upper portion of the tube opening 17 above the shoulder 19, also fitting with a considerable freedom in the reduced portion 18. Each said pin is mounted on a suitable carrier 22 shown in the present instance in the form of a rod or bar, see Figure 1, extending the full length of the baker, one at the front and one at the rear. The rod at the front, as shown, carries one pin 20 for each unit, and the rod 22 at the rear is likewise equipped, the pins in the form of the invention shown, though the detailed construction is not essential, being threaded at 24 at the upper end, the threaded portion being seated in and engaged with a suitably tapped hole in the bar or rod 22. Each rod is supported on spiral springs 25 bearing from above on the casing 10 and from below on the rod or bar 22. As shown each spring 25 encircles the corresponding pin 20.' The pins are shown as withdrawn, which is their normal position, and each rod or bar 22, as shown, is guided and encased in a suitable channel 26 which prevents the accumulation of dirt on the springs and rod and also prevents lateral displacement of the pins and carrier, maintaining the same in condition for uniform and dependable operation.

Each rod 22, as shown, is further provided with a handle 27 near the centre, as shown particularly in Figure 1, by which the punch and clearing pins carried by the corresponding rod or bar 22 may be actuated and the bar 22 further has a sliding engagement with pins 28 seated in the plate 10, and the heads 29 of the pins limit the motion of the bars.

A feature which is further of interest is the wide clearance between the pins 20 and the upper portion of the tube 17 above the inclined shoulder 19, the point of the pin being in the normal or retracted position in each instance just above the shoulder 19. This arrangement, as shown, provides for a free and clear escape of the gases from the product through the restricted portion 18 of the vent and around the pin through the enlarged upper portion of the tube.

In operation, the baker having been charged, each cavity containing a sausage enclosed in a suitable quatity of dough, as described in my previous patent, the mold closed, and the heat applied, the dough immediately begins to swell, and a crust covering the inner wall of the mold is formed. Prior to the formation of the crust, whatever steam is generated, the amount being comparatively small, escapes through the vents, but immediately on the formation of the crust, the vents are closed. As soon as the crust has formed to any considerable thickness, the operator who from experience realizes that the sausage is beginning to cook and steam is being generated rapidly and in considerable quantities in the dough and in the sausages, pushes downwardly on the respective handles 27, causing the pins 20 to descend in gangs through the respective openings 18, clearing the openings and forming in each roll and in each sausage a small puncture at each end, permitting the steam to escape through the crust. This operation is repeated from time to time during baking as frequently as experience shows to be necessary. In this way the rolls are kept dry during baking, and as completed, are well browned and crisped in accordance with the taste of the majority of the customers, and the sausage being thus punctured, swells and discharges its aroma into the roll which is thus flavored most appetizingly.

I have thus described specifically and in detail a single embodiment of my invention in order that the nature and operation of the same may be clearly understood; however, the specific terms herein are used descriptively rather than in a limiting sense, the scope of the invention being defined in the claims.

What I claim and desire to secure by Letters Patent is:

1. In a baking mold having a closed mold cavity with a vent leading directly to the mold cavity proper, a pin mounted to reciprocate in the vent and to project beyond the same into the mold cavity, to puncture the material baked in the mold providing for the escape of moisture and gases therefrom.

2. A baking mold having a closed mold cavity with vent openings leading directly into the normal cavity and means for clearing the openings of dough and crust to release the gases and moisture from the product as baked.

3. A baking mold having a closed mold cavity with a vent opening leading directly into said cavity, a pin sliding in the opening, and a spring holding the pin in normally retracted position.

4. A baking mold having a vent opening, a pin sliding in the opening and a spring holding the pin in normally retracted position, the opening having a reduced portion to guide the pin, and an enlarged portion which surrounds the pin in retracted position, the enlarged portion providing for the escape of steam and gases around the pin, the reduced portion being below the retracted position of the pin.

5. A baking mold having a plurality of closed baking cavities, with a vent for each cavity leading directly into the normal cavity, a pin sliding in each vent, a common actuating member on which each pin is mounted, and means for maintaining the pins normally in retracted position.

6. A baking mold having a plurality of baking cavities, a vent for each cavity, a pin sliding in each vent, a common actuating member on which each pin is mounted, means for maintaining the pins normally in retracted position, and means enclosing the actuating member, guiding the same and preventing the accumulation of dust thereon.

7. In a machine for molding and baking sausage rolls with a sausage therein, the same having mold cavities, and means for heating the same, each cavity having a vent with a pin sliding in the vent, means for holding the said pin in retracted position, the pin being elongated as compared with the length of the vent, so that it extends when advanced to a point near the centre of the mold, making it feasible to puncture both the roll and the sausage by advancing the pin.

8. In a machine for molding and baking sausage rolls with a sausage therein, the same having mold cavities, and means for heating the same, each cavity having a vent with a pin sliding in the vent, means for holding the pin normally in retracted position, the pin being elongated as compared with the length of the vent, so that it extends when advanced to a point near the centre of the mold, making it feasible to puncture both the roll and the sausage by advancing the pin, the vent having an enlarged portion sufficient to permit the steam and gases to escape by the pin, and a reduced portion below the normal position of the pin serving as a guide for the pin.

9. A baking mold having a completely enclosed baking cavity and a vent opening for said cavity to release the steam and gases generated during baking the opening leading directly into the main cavity and a pin for clearing the vent opening.

Signed by me at Baltimore, Maryland, this 11th day of August, 1925.

HUNTINGTON D. SAWKINS.